United States Patent
Hawkins

(10) Patent No.: US 8,175,643 B1
(45) Date of Patent: *May 8, 2012

(54) SWITCHING STATES BETWEEN TWO COMPUTING DEVICES

(75) Inventor: Jeffrey Hawkins, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,073

(22) Filed: Nov. 16, 2011

Related U.S. Application Data

(63) Continuation of application No. 13/150,923, filed on Jun. 1, 2011, now Pat. No. 8,090,406, which is a continuation of application No. 12/938,793, filed on Nov. 3, 2010, now Pat. No. 7,979,087, which is a continuation of application No. 12/606,068, filed on Oct. 26, 2009, now Pat. No. 7,844,297, which is a continuation of application No. 11/105,197, filed on Apr. 12, 2005, now Pat. No. 7,623,892, which is a continuation-in-part of application No. 10/815,406, filed on Apr. 1, 2004, now Pat. No. 7,383,061.

(60) Provisional application No. 60/460,013, filed on Apr. 2, 2003.

(51) Int. Cl.
*H04M 1/00* (2006.01)

(52) U.S. Cl. ............... 455/556.1; 455/556.2; 455/557; 455/41.2; 455/418; 455/566

(58) Field of Classification Search ....... 455/556.1–557, 455/550.1, 90.3, 575.1, 418–420, 466, 41.2
See application file for complete search history.

(56) References Cited

U.S. PATENT DOCUMENTS

| | | | |
|---|---|---|---|
| 4,856,088 | A | 8/1989 | Oliwa et al. |
| 5,020,090 | A | 5/1991 | Morris |
| 5,297,142 | A | 3/1994 | Paggeot et al. |
| 5,625,673 | A | 4/1997 | Grewe et al. |
| 5,664,228 | A | 9/1997 | Mital |
| 5,724,655 | A | 3/1998 | Grube et al. |
| 5,727,159 | A | 3/1998 | Kikinis |
| 5,732,346 | A | 3/1998 | Lazaridis et al. |
| 5,797,089 | A | 8/1998 | Nguyen |

(Continued)

FOREIGN PATENT DOCUMENTS

EP 1215575 A2 6/2002

(Continued)

OTHER PUBLICATIONS

Dasgupta, S. et al., "A Movable User Interface Based on a Simple X-Window Like Protocol," Gas Authority of India Ltd., Aug. 1991, pp. 199-203, vol. 3.

(Continued)

*Primary Examiner* — Sharad Rampuria

(57) ABSTRACT

A method for switching use between a first computing device and a second computing device is provided. The method may be performed by the first computing device. An event is detected while a first application is operated on the first computing device. In response to detecting the event, data corresponding to the first application is automatically transmitted to the second computing device, and a second application is automatically initiated on the second computing device. The second application has a functionality that is equivalent to the functionality of the first application on the first computing device and utilizes the data transmitted from the first device in performing one or more operations.

20 Claims, 9 Drawing Sheets

U.S. PATENT DOCUMENTS

| | | | |
|---|---|---|---|
| 5,835,732 A * | 11/1998 | Kikinis et al. ............. 710/303 | |
| 5,870,680 A | 2/1999 | Guerlin et al. | |
| 5,873,045 A | 2/1999 | Lee et al. | |
| 5,983,073 A | 11/1999 | Ditzik | |
| 6,034,621 A | 3/2000 | Kaufman | |
| 6,154,843 A | 11/2000 | Hart, Jr. et al. | |
| 6,157,982 A | 12/2000 | Deo et al. | |
| 6,311,209 B1 | 10/2001 | Olson et al. | |
| 6,401,113 B2 | 6/2002 | Lazaridis et al. | |
| 6,437,836 B1 | 8/2002 | Huang et al. | |
| 6,463,299 B1 | 10/2002 | Macor | |
| 6,516,202 B1 | 2/2003 | Hawkins et al. | |
| 6,546,262 B1 | 4/2003 | Freadman | |
| 6,577,877 B1 | 6/2003 | Charlier et al. | |
| 6,625,472 B1 | 9/2003 | Farazmandnia et al. | |
| 6,633,759 B1 | 10/2003 | Kobayashi | |
| 6,754,468 B1 | 6/2004 | Sieben et al. | |
| 6,757,719 B1 | 6/2004 | Lightman et al. | |
| 6,774,796 B2 | 8/2004 | Smith | |
| 6,779,019 B1 | 8/2004 | Mousseau et al. | |
| 6,792,088 B2 | 9/2004 | Takeuchi | |
| 6,847,336 B1 | 1/2005 | Lemelson et al. | |
| 6,867,965 B2 | 3/2005 | Khoo | |
| 6,871,063 B1 | 3/2005 | Schiffer | |
| 6,895,220 B2 | 5/2005 | Usui | |
| 6,928,305 B2 | 8/2005 | DeWald et al. | |
| 6,947,975 B2 | 9/2005 | Wong et al. | |
| 6,957,085 B2 | 10/2005 | Shin et al. | |
| 6,999,792 B2 | 2/2006 | Warren | |
| 7,003,308 B1 | 2/2006 | Fuoss et al. | |
| 7,013,112 B2 | 3/2006 | Haller et al. | |
| 7,016,704 B2 | 3/2006 | Pallakoff | |
| 7,027,035 B2 | 4/2006 | Youden | |
| 7,047,038 B1 | 5/2006 | Macor | |
| 7,054,594 B2 | 5/2006 | Bloch et al. | |
| 7,095,387 B2 | 8/2006 | Lee et al. | |
| 7,110,752 B2 | 9/2006 | Okajima | |
| 7,116,995 B2 * | 10/2006 | Savinen et al. ............. 455/466 | |
| 7,127,270 B2 | 10/2006 | Sinclair | |
| 7,177,665 B2 | 2/2007 | Ishigaki | |
| 7,224,991 B1 | 5/2007 | Fuoss et al. | |
| 7,342,571 B2 | 3/2008 | Fraser et al. | |
| 7,383,061 B1 | 6/2008 | Hawkins | |
| 7,386,324 B2 * | 6/2008 | Moriyama et al. ......... 455/556.2 | |
| 7,558,563 B2 | 7/2009 | Silverbrook et al. | |
| 7,623,892 B2 | 11/2009 | Hawkins | |
| 7,650,115 B2 | 1/2010 | Caldwell et al. | |
| 7,657,227 B2 * | 2/2010 | Doan et al. ............. 455/41.3 | |
| 7,844,297 B2 | 11/2010 | Hawkins | |
| 2002/0032855 A1 | 3/2002 | Neves et al. | |
| 2002/0151283 A1 | 10/2002 | Pallakoff | |
| 2003/0093693 A1 | 5/2003 | Blight et al. | |
| 2003/0098857 A1 | 5/2003 | Gettemy et al. | |
| 2003/0160735 A1 | 8/2003 | Lee et al. | |
| 2003/0160755 A1 | 8/2003 | Gettemy et al. | |
| 2003/0160767 A1 | 8/2003 | Wong et al. | |
| 2003/0160771 A1 | 8/2003 | Fraser et al. | |
| 2003/0233414 A1 | 12/2003 | Henry | |
| 2004/0006551 A1 | 1/2004 | Sahinoja et al. | |
| 2004/0198220 A1 | 10/2004 | Whelan et al. | |
| 2005/0063352 A1 | 3/2005 | Amara et al. | |
| 2005/0131596 A1 | 6/2005 | Cherrington et al. | |
| 2006/0021059 A1 | 1/2006 | Brown et al. | |
| 2006/0136985 A1 | 6/2006 | Ashley et al. | |
| 2007/0069975 A1 | 3/2007 | Gettemy et al. | |
| 2007/0290989 A1 | 12/2007 | Gettemy et al. | |
| 2008/0032755 A1 | 2/2008 | Fraser et al. | |
| 2008/0238813 A1 | 10/2008 | Gettemy et al. | |
| 2010/0222046 A1 | 9/2010 | Cumming | |

FOREIGN PATENT DOCUMENTS

| | | |
|---|---|---|
| EP | 1330098 A1 | 7/2003 |
| WO | WO 99/26159 A2 | 5/1999 |

OTHER PUBLICATIONS

PCT International Search Report and Written Opinion, PCT/US2006/014060, Sep. 1, 2006, 12 pages.

Office Action mailed Dec. 1, 2005, issued in related U.S. Appl. No. 10/815,406, filed Apr. 1, 2004.

Office Action mailed May 30, 2006, issued in related U.S. Appl. No. 10/815,406, filed Apr. 1, 2004.

Advisory Action mailed Aug. 3, 2006, issued in related U.S. Appl. No. 10/815,406, filed Apr. 1, 2004.

Office Action mailed Sep. 6, 2006, issued in related U.S. Appl. No. 10/815,406, filed Apr. 1, 2004.

Office Action mailed Mar. 8, 2007, issued in related U.S. Appl. No. 10/815,406, filed Apr. 1, 2004.

Office Action mailed Aug. 23, 2007, issued in related U.S. Appl. No. 10/815,406, filed Apr. 1, 2004.

Notice of Allowance mailed Feb. 20, 2008, issued in related U.S. Appl. No. 10/815,406, filed Apr. 1, 2004.

Office Action mailed Oct. 2, 2006, issued in related U.S. Appl. No. 11/105,197, filed Apr. 12, 2005.

Office Action mailed Mar. 22, 2007, issued in related U.S. Appl. No. 11/105,197, filed Apr. 12, 2005.

Advisory Action mailed Jul. 6, 2007, issued in related U.S. Appl. No. 11/105,197, filed Apr. 12, 2005.

Office Action mailed Oct. 3, 2007, issued in related U.S. Appl. No. 11/105,197, filed Apr. 12, 2005.

Office Action mailed May 7, 2008, issued in related U.S. Appl. No. 11/105,197, filed Apr. 12, 2005.

Office Action mailed Oct. 4, 2008, issued in related U.S. Appl. No. 11/105,197, filed Apr. 12, 2005.

Notice of Allowance mailed Aug. 24, 2009, issued in related U.S. Appl. No. 11/105,197, filed Apr. 12, 2005.

Notice of Allowance mailed Jul. 30, 2010, issued in related U.S. Appl. No. 12/606,068, filed Oct. 26, 2009.

Notice of Allowance mailed Mar. 2, 2011, issued in related U.S. Appl. No. 12/938,793, filed Nov. 3, 2010.

Notice of Allowance mailed Aug. 19, 2011, issued in related U.S. Appl. No. 13/150,923, filed Jun. 1, 2011.

* cited by examiner

SWITCHING STATES BETWEEN TWO COMPUTING DEVICES

RELATED APPLICATIONS

This application is a continuation of U.S. patent application Ser. No. 13/150,923, filed Jun. 1, 2011 now U.S. Pat. No. 8,090,406; which is a continuation of U.S. patent application Ser. No. 12/938,793, filed Nov. 3, 2010, issued as U.S. Pat. No. 7,979,087; which is a continuation of U.S. patent application Ser. No. 12/606,068, filed Oct. 26, 2009, issued as U.S. Pat. No. 7,844,297; which is a continuation of U.S. patent application Ser. No. 11/105,197, filed Apr. 12, 2005, issued as U.S. Pat. No. 7,623,892; which is a continuation-in-part of U.S. patent application Ser. No. 10/815,406, filed Apr. 1, 2004, issued as U.S. Pat. No. 7,383,061; which claims a benefit of, and priority to, U.S. Provisional Application No. 60/460,013, filed Apr. 2, 2003, all of which are herein incorporated by reference in their entirety.

BACKGROUND

1. Technical Field

The disclosed embodiments relate generally to the field of computing devices. In particular, embodiments of the invention relate to a system and method for enabling a person to switch use of computing devices.

2. Description of Related Art

Handheld devices and computers are increasingly becoming more powerful and functional devices. But even with advances in memory and processors, size and form factor are limitations that are difficult to overcome in enhancing the role of such devices. The result is that handheld computing devices tend to be centric about specific functions, particularly about uses that require limited user-input. For example, many handheld devices are multifunction devices that can have device roles that include: personal digital assistant (PDA); cellular phone; portable media player; voice recorder; global positioning system (GPS) device; and portable memory for carrying files electronically.

While handheld devices can be used for text-entry, their form factors limit the integration of normal-size keyboards. Often, handheld devices provide digital keyboard mechanisms, thumb-keyboards, or one-button software aided key selection mechanisms for enabling users to enter text. Some devices allow the user to use attachment keyboards, but such devices need to be purchased and carried separately with the handheld device.

The advance of local wireless connections, such as provided by Bluetooth and WIFI, have made it easier for users to utilize different types of computing and accessory devices together, in an integrated fashion. For example, wireless headsets and cellular phones are common device combinations, which allow the user to eliminate a physical connection to the cellular phone.

Local wireless mediums are now pervasive in aiding computer users to establish home networks, on-the-go Internet connections, and device-to-device communications. The use of device-to-device links across local wireless mediums facilitates users in improving and diversifying the functions and capabilities of computing devices, particularly small form factor computing devices. But sharing files and information across wireless links are generally manual processes, requiring the user to take steps to establish the connection, and to use the user-interface features of one computing device to view and copy from the directories and records of the other computing device using the wireless link.

DETAILED DESCRIPTION

Overview

Figure 1:
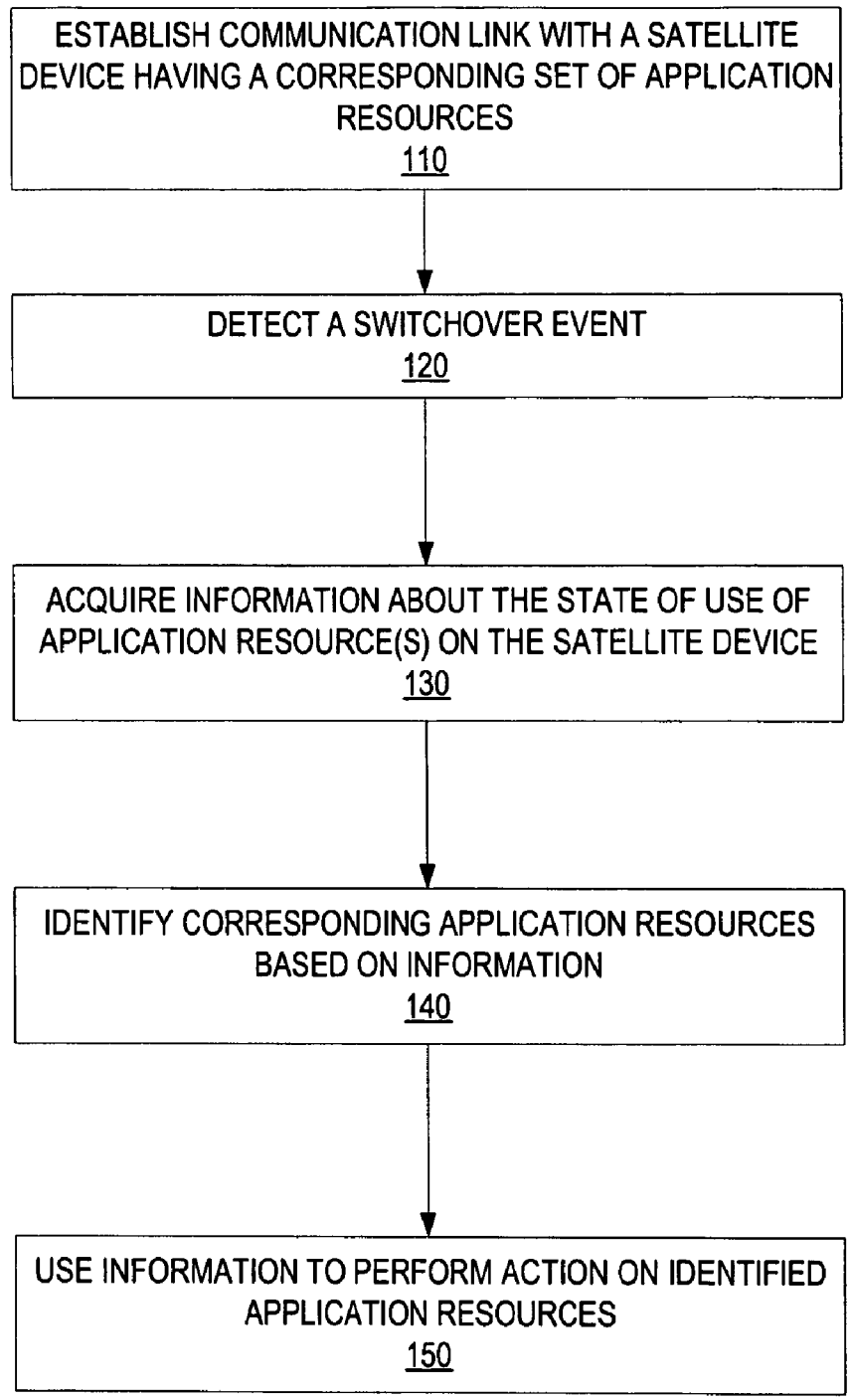
FIG. 1 illustrates a basic method of pairing devices and programmatically sharing state information between the paired devices for purpose of facilitating the user in switching computing devices, according to an embodiment of the invention.

Embodiments of the invention facilitate users who operate multiple computing devices in more readily switching from one computing device to another. A person may initiate a task or operation on one computing device, switch computing devices, and then have information or data about the initiated task or operation programmatically carried over to the new computer to facilitate his transition between computing devices. This allows the person to complete the task or operation on a new computing device without having to repeat many of the actions associated with initiating the task or operation on the previously used computing device. The result is that the user can start on the computing device where he left off on the previous computing device.

While embodiments described herein are applicable to numerous types of computing devices, an embodiment has particular application to mobile computing and record management. For example, a smart phones, PDA, or other handheld device that is mobile, but restrained in capability (e.g. keyboard size, processing resources, display size, memory), may be paired with a larger more functional computing device (e.g. full size QWERTY keyboard and display). The user may manage, view and perform operations on records retained on the handheld device, but the constraints of the handheld device may limit the user's desire or ability to perform many operations. For example, a limited keyboard and/or display size of the handheld computer may make it difficult or cumbersome for the user to enter large strings of text, insert attachments, or enter special characters (e.g. '@'). Embodiments described herein enable the user to switch readily between computing devices as desired, and in particular to switch from a handheld device to another computing device. By activating or performing some other operation to start use of the larger computing device, the two computing devices communicate, and the state of use of the handheld device is at least partially transferred to the larger computing device. The result is that the user can start on the new computing device where he left off on the handheld device.

An embodiment may be implemented between two computing devices, such as between two devices selected from a group consisting of handheld devices, microcomputers, laptops, and desktop computers. Given that different types of computing devices may be employed, each computing device may have a different set of capabilities. For example, each computing device may have a particular kind of keypad or input mechanism, form factor and/or communication capability. In one embodiment, the user may, on a first computing device (e.g. smart phone) select a resource, initiate use of an application resource, or otherwise place the selected application resource in a state of use. The application resource may correspond to a data object, a record, an application or program, a script, a macro, or any other type of application resource. When selected or placed in a particular state of use (e.g. a user opens a record), an embodiment enables the person to switch over and use the second computing device, where some action is automatically performed on an equivalent or corresponding application resource. The action may correspond to a corresponding application resource being identified or generated, and then being placed in a similar or equivalent state of use. An embodiment such as described may be performed programmatically. As a result, minimal user action may be needed for the user to initiate use of an application resource on one computing device, and then switchover to use a second computing device a corresponding application resource.

According to an embodiment, a person can manage and use different computing devices for purpose of viewing, editing and composing records. Specific types of records contemplated include messages and documents. In one embodiment, a person may initiate a view of a message (email, instant message) on one computing device, then switchover and use a second computing device to use that message as the basis for composing a reply message. As will be described, the two computing devices may be linked wirelessly, so that operations associated with the switchover can be performed programmatically. Among other benefits, the user may switch computing devices, so that operations initiated on the previous computing device are seamlessly carried onto the new computing device, with minimal user-intervention.

Furthermore, the two computing devices may be linked or synchronized so that individual records on one computing device have correspondence with records on the other computing device. For example, a user may employ a handheld computer and a laptop computer to each carry copies of a user's inbox. Prior to a switchover, the user may use one computing device to open or view a specific message. The user may then elect to use a second computing device to perform additional actions using a corresponding copy of that message. Since there may be correspondence between messages on the two computing devices, information about a state of use of a particular message may be transferred between computing devices. Thus, when a given message is opened on a first computing device and the user elects to switchover to a second computing device, the corresponding message (e.g. the copy) on the second computing device is opened using state of use information acquired about the message on the first computing device. In addition to messages, other records and documents may be similarly treated and used between computing devices. For example, word processing documents, notes, contacts, calendar entries, memos, ink notes and voice memos may be applied to embodiments of the invention.

As used herein, a switchover event corresponds to the occurrence of any event, or sequence of events, that are designated as signifying the user's intent or act of switching computing devices.

The terms "handheld computer", "handheld computing device" or "handheld device" may include any computing device that is normally carried in one hand, such as a PDA, phone, microcomputer, or personal Global Positioning System device.

The term "programmatically" means through the use of computer-executed instructions, such as through a program or application.

The state of use of any application resource may have different values and/or characteristics depending on implementation. For example, the state of use may include information that identifies a record as anyone of the following: not in use, not in use but selected, opened, or opened and modified or otherwise altered. In the case of an executable or script or similar functional application resource, the state of use may include the item being launched, opened, or even partially executed.

According to an embodiment, a method is provided to enable the person to switch use of computing devices when working with records and/or documents. A method such as described may be implemented for an individual operating two (or more) computing devices that share and synchronize sets of records. One or more operations may be performed to update and maintain correspondence between the two sets of records. A switchover event may be detected, where the event corresponds to the individual using a second computing device while already using a first computing device. Once the switchover event is detected, state of use information may be received on the second computing device. This information indicates the state of use of one or more records on the first computing device. This information may be used to affect the state of use of corresponding records on the second computing device. In particular, the corresponding records on the second computing device may be placed in a state of use, or in a selected state for subsequent use.

One or more embodiments described herein may be implemented through the use of modules. A module may include a program, a subroutine, a portion of a program, or a software component or a hardware component capable of performing one or more stated tasks or functions. As used herein, a module can exist on a hardware component such as a server independently of other modules, or a module can be a shared element or process of other modules, programs or machines. A module may reside on one machine, such as on a client or on a server, or a module may be distributed amongst multiple machines, such as on multiple clients or server machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Methodology

An embodiment such as shown by FIG. 1 may be implemented on a computing device that is linked with another computing device through a communication channel. Each computing device may be operable by a common user. When a computing device is paired with another device across a communication channel, the other device may be referred to as a "paired" or "associated" device.

An embodiment such as described in FIG. 1 assumes that some or all of the application resources on a computing device have correspondence to individual application resources on the associated device. For example, each computing device in the pair may have an equivalent or identical application, executable script, or set of data objects. Application resources may also include computer-implemented processes. For example, a process initiated on one computing device may be programmatically initiated on another computing device, in response to detection of a switchover event.

According to one embodiment, the application resources for which information is shared between computing devices are records, or records of a particular type (e.g. emails). Then computing device may be used to store a set of records, where each record of the set has correspondence with individual records on the associated device. As will be described, such correspondence between record sets residing on different computing devices may be established through synchronization processes performed with each other or with one or more common external sources.

In step 110, a communication link is established between the computing device and the associated device. The communication link may be established by a local connection. One embodiment provides that the communication link is established using a local wireless communication medium, such as provided by Bluetooth or WIFI. Alternatively, the communication link may be established through a wire line connection such as provided by a Universal Serial Bus (USB) port. The establishment of the communication link means that the computing device is capable of communicating with the associated device. For example, the communication link may be established by bringing a Bluetooth enabled device into operational proximity with the Bluetooth associated device of the user. Once the computing device is brought into operational proximity, it can be activated and/or operated to communicate with the associated device.

Step 120 provides that a switchover event is detected. The switchover event may correspond to an occurrence of a designated event, or series or sequence of designated events, that signal the user's intent to switch computing devices. In one embodiment, the computing device polls or otherwise communicates with the associated device in order to detect the switchover event. A more detailed description of a switchover event under one embodiment is provided with FIG. 5.

Once the switchover event is detected, step 130 provides that the computing device acquires information about the state of use of the associated device. In an embodiment, this information may include identification of application resources on the associated device for which there are corresponding application resources. For records and documents, this information may correspond to identification of records or documents that are in an open or selected state and for which there are copies or corresponding records or documents on the computing device. For other types of application resources such as executables and scripts, the state information may identify those resources that are in a state of being used or executed. Additionally, the state information may identify setting or mode information, such as what folders are opened on the associated device, or what user-account is in use.

In step 140, the computing device identifies the application resources that have correspondence to the application resources of the associated device identified in the previous step. Depending on the implementation, this may correspond to records, documents, programs, executables, scripts, macros, folders, accounts and settings that are equivalent, copies of, versions for, or are otherwise deemed to be corresponding to the resources identified on the associated device. For example, in one embodiment, a record that corresponds to an open record on the associated device is identified. The correspondence between records may be established through, for example, the performance of a synchronization process. The synchronization process may be performed prior to the switchover event, or concurrently at the time of the switchover event in order to create the correspondence between records.

Step 150 provides that information acquired in step 130 is used to perform one or more actions on the application resources identified in step 140. In one embodiment, the actions performed may include placing the application resources identified in step 140 in an equivalent or similar state of use as that of the corresponding application resource on the associated device. For example, the application resource identified in step 140 may be opened if the information acquired in step 130 indicates that the corresponding application resource on the associated device is opened and in use. However, the result of this step does not necessarily mean that the application resources on the two computing devices are in an exact same condition. For example, the action performed on the computing device in step 150 may be to simply open a document, where on the associated computing device, the corresponding document is both opened and modified.

While an embodiment such as described above provides for state information about resources in use, an embodiment provides for other types of state information to be transferred and used between computers. For example, the state information may identify an account in use, a directory or portion of a directory being viewed, or an open folder. The account in use, for example, may limit the availability of certain programs, files, records or other application resources if those resources are not designated as belonging to an account. Two paired devices may have correspondence in user-accounts, so that the transfer of state information in connection with a switchover may cause the second device of the switchover to make only the corresponding records or resources of the identified account available. Similarly, two paired computing devices may have correspondence in directories, portions of directories, or folders. Thus, state information carrying identification of directory portions of folders in view on the first computing device may be used to implement the same view on the second computing device.

Figure 2:
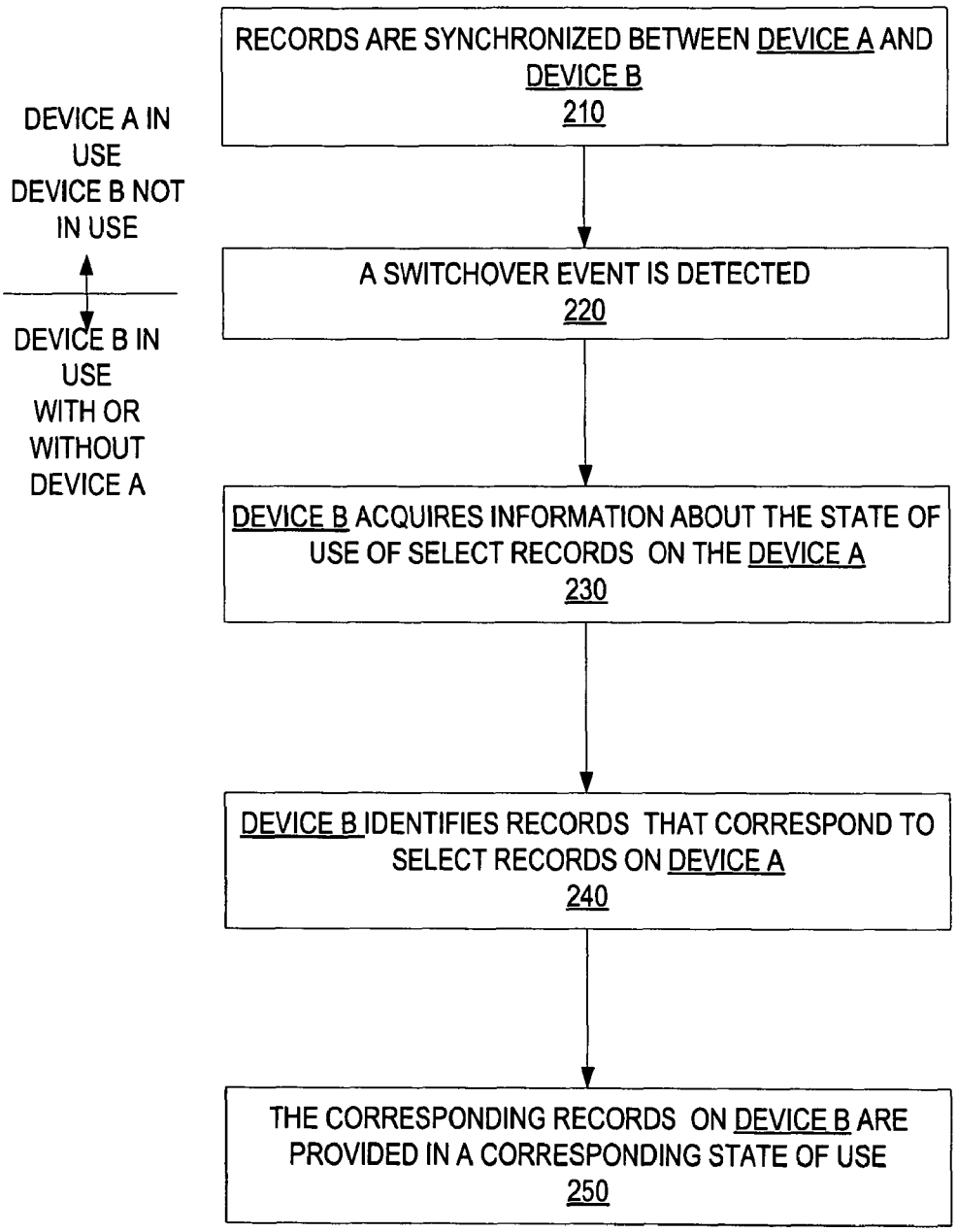
FIG. 2 illustrates a method in which two computing devices may be paired for purpose of sharing state information pertaining to the use of records on one computing device in anticipation of the user switching to the other computing device.

FIG. 2 illustrates a more detailed embodiment in which a person controls two computing devices that share correspondence in records. For example, a person may carry or have access to two different computing devices, each having a different set of capabilities and functionality. An embodiment such as described in FIG. 2 enables the user to perform some action on the record of one computing device ("Device A"), then switch over to perform additional actions on a corresponding record residing on another computing device ("Device BOO). An embodiment such as described in FIG. 2 focuses on records as application resources for which state information is passed.

In step 210, records are synchronized between Device A and Device B. For example, Device A and Device B may perform one or more synchronization processes with each other, or with a service or other computer system, so that records on Device A match records of Device B. For example, synchronization processes may be performed between devices as a matter of routine or in response to specific events. This may mean that all records created or modified prior to the last synchronization process between the devices may have the same content or body. Furthermore, individual records in the record set of each device are associated with individual records of the record set of the other device. Thus, when another synchronization process occurs, records on each device are updated based on changes to the associated record on the other device.

Step 220 provides that a switchover event is detected. The switchover event may be detected from Device A and/or Device B. Prior to the switchover event, FIG. 2 illustrates that Device A was in use, and Device B was not. At the time of the switchover event, both Device A and Device B are in use. After the switchover event, Device A may (at the option of the user) be de-activated.

In step 230, Device B acquires information about the state of use of select records on Device A. In one embodiment, Device B acquires information about the state of use of records (i) for Which Device B has correspondence, and (ii) which are in an active or opened state of use. Thus, unopened records of a list may be ignored in this step. Highlighted items may or may not be ignored, depending on the implementation. Records that are open and possibly in a modified state may be identified. In one embodiment, the information acquired does not indicate whether the record on Device A is modified. For example, if the user opens a record on Device A, then modifies it with the addition of text, the information acquired in this step may not include any information about the added text, or even that text was added. Rather, the information may only identify that the particular record was in an open state. However, under an alternative embodiment, information about whether the record was modified, and if so, what the modification contained, may be acquired in this step. Thus, when the switchover occurs when a record is both opened and modified, whether the modification is carried over to the second computing device is a matter of implementation choice.

Step 240 provides that Device B identifies records that correspond to the select records of Device A. In one embodiment, the corresponding record may be identified as a result of past synchronization events, which establish the correspondence between records on the two computing devices.

Step 250, one or more records on device B are provided in a state of use that is based on the state of use of corresponding records on Device A. According to one embodiment, the records identified in step 240 may be provided in an open state on Device B, based on information that indicates its corresponding record on Device A is in an open and/or used state. But as mentioned, the appearance or version of the record on Device B does not have to be exactly the same as the corresponding record on Device A. For example, changes made to the corresponding record on Device A are not necessarily carried over onto the record on Device B.

One case example for a method such as described with FIG. 2 is a user who operates a combination of a small portable computer (e.g. smart phone, personal digital assistant) and more functional computer (e.g. desktop computer, laptop computer, laptop/PDA hybrid). Each device may be linked through a Bluetooth or WIFI medium. The user may synchronize emails, contacts, calendar entries, memos, electronic notes and other records or documents created through various applications, such as the PALM OS (manufactured by PALMSOURCE INC.), POCKETPC (manufactured by the MICROSOFT CORP), and/or OUTLOOK (manufactured by the MICROSOFT CORP.). The user may open a message on, for example, a smart phone. After viewing the message, the user may decide to perform some action, such as compose a message or reply to the message being viewed. But the limited capabilities of the smart phone (poor alphanumeric entry keys, limited processing resources and performance) may cause the user to switch computing devices to better perform this action, using the functionality or capability of a larger computing device. For example, the user may wish to use a full size keyboard, or insert an attachment, and these capabilities/functions are not provided on the smart phone. According to an embodiment of the invention, upon opening the new message and performing some action recognized as a switchover event, the corresponding message on the larger computer is also opened. Furthermore, if the user generated a reply or other new message on the smart phone, an embodiment may also provide that information for generating a corresponding message is carried over to the larger computer as well.

After the switchover, several variations and possibilities may be implemented. In one variation, the record on Device B is modified (or deleted) by the user, and the modified record on Device B is reconciled with the corresponding record on Device A. The reconciliation may be in the form of a synchronization or a manual transfer. As an alternative, a similar transfer from Device B to Device A may be implemented. In such a variation, the information about the state of use of the record on Device B includes information to implement the modification of that record to the corresponding record on Device A.

A scenario in which a handheld device and a larger computing device are paired serves to illustrate different variations of embodiments of the invention. In one embodiment, the pairing of devices may be configured to programmatically mirror state information for purpose of enabling the user to switch from the handheld device to the larger computing device. If at the time the switchover is detected, the user has on the handheld device an open or selected message, then detection of the switchover results in a corresponding message being programmatically selected and provided in an opened state on the larger computer. On the larger computer, the user may, for example, generate a reply message and compose a body for the new message. However, in order to transmit the message, the user may need the capabilities of the smart phone. In order to transfer the update of the corresponding message to the handheld device, the user may initiate a synchronization event, in which case the new reply message is added to the smart phone. Alternatively, the user may initiate a manual transfer of the single message to the smart phone. Or the user may trigger a programmatic switchover by performing some action that or sequence that is designated to be coincide with a switchover from Device B to Device A. In the latter switchover, the information that is carried from Device B to Device A may carry the identification of the new reply message and the body of the message. The information about the state of use for that message may be "open" or "outbox".

As the examples provided above illustrate, embodiments of the invention may facilitate a user who wishes to rely on a smaller device in a particular setting, such as in a vehicle or "on the go". In such settings, the user may need, for example, the keyboard or display size of the larger computer, but the user may also wish to avoid using the larger device until necessary. For example, wireless messaging may require the user to on occasion provide an attachment, or compose a detailed body or address for an outgoing message. The user may rely on the smaller smart phone to receive and open messages. When the user views a message that requires a response best handled on the larger computer (e.g., needs attachment and/or body), the user may simply activate the larger computing device and immediately view a copy of the opened message, where he can then use the superior memory, processing resources and input devices of the larger computer.

While an embodiment such as described in FIG. 2 is provided in the context of records, embodiments of the invention are also applicable to other application resources, including other application resources that are associated with records or documents. For example, an embodiment described with FIG. 2 may be performed in the context of system data that organizes and presents records in folders and/or maintains account information. Furthermore, as described with FIG. 1, embodiments of the invention may extend to other types of application resources, such as programs and scripts, or computer-implemented processes such as those that render streaming media.

System Description

Figure 3:
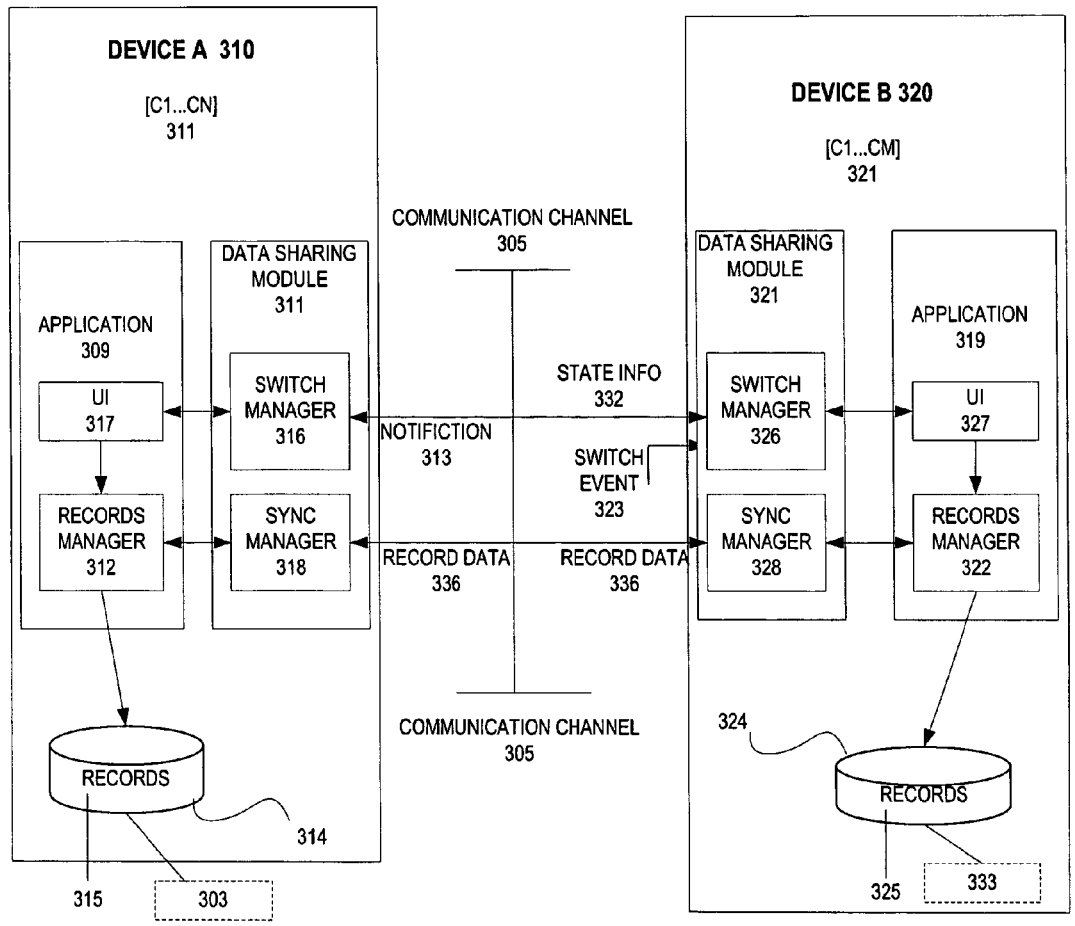
FIG. 3 illustrates a system for sharing state information and resources amongst two or more computing, according to an embodiment of the invention.

FIG. 3 illustrates a system for sharing state information and resources amongst two or more computing, according to an embodiment of the invention. The system includes Device A 310 and Device B 320 that can communicate with one another across a local communication channel 305. The components of Device A 310 are shown to include, a data store 314 containing records 315, an application 309, and a data sharing module 311. The application 309 may actually be one of many applications that provide access to and manage records 315 of the data store 314. Components of the application 309 include a user-interface 317 and a record manager 312. Components of the data sharing module 311 include the switch manager 316 and the synchronization manager 318. Device B 320 is shown to include similar components as Device A 310, including a data store 324 containing records 325, an application 319, and a data sharing module 321. As with Device A 310, the application 319 may be one of many that executes on Device B 320 and provides access to or manages records 325. While Device A 310 and Device B 320 are illustrated as having similar components, a typical case may be that the two devices are in fact very different in their respective capabilities 311, 321. Thus, for example, one of the devices may have better processing/memory resources, a better screen, or a larger keyboard. The difference in capabilities 311, 321 may be the motivation for the user to want to switch computing devices.

For purpose of description, the applications 309, 319 on the different devices are assumed to be the same (e.g. email application), or have substantially similar functionality (e.g. they may be different versions or variations of one another). One example for applications 309, 319 include an email management program, such as VERSAMAIL, provided by PALMONE INC. and MICROSOFT CORP. However, other types of applications may be employed with embodiments of the invention, including applications for managing contacts, calendars, and documents. For example, one or both devices 310, 320 may operate the PALM OS, manufactured by PALMSOURCE INC. or POCKET PC, manufactured by the MICROSOFT CORP. Both of the aforementioned platforms include integrated applications and conduits for managing and sharing various types of records. The data store 314, 324 on each device may correspond to a local database or directory that can be read by the record manager 312, 322 of the corresponding application 309,319. The UI 317, 327 of each application 309,319 enables the user to access records 315, 325 on each respective device. Additionally, the UI 317, 327 of each application 309, 319 may enable the user to view, modify, delete or create records 315, 325 from the respective data store 314, 324. The record managers 312, 322 of each application 309, 319 manages retrieval and input of records 315, 325 on their respective device. Functions of the record managers 312, 322 include managing data format operations, and packaging data for transfer during synchronization or other transfer processes. The record managers 312, 322 may also detect incoming data (through synchronization processes, for example) to determine whether the incoming data is for the applications 309, 319 of the respective record managers. In such instances, the record managers 312, 322 can store the new data as appropriate records, and format the new data as needed.

The communication channel 305 may correspond to any local connection between two computing devices. In one embodiment, the connection is wireless, such as provided by Bluetooth, WIFI, or Infrared port. Device A 310 and Device B 320 may exchange record data 332 across the channel 305. The exchange of data across these communication mediums may be in response to or part of synchronization processes and switchover events.

Record data 336 may be shared amongst the Device A 310 and Device B 320 through the use of synchronization processes. Synchronization processes may be performed through operation of synchronization managers 318, 328. During a synchronization process, synchronization manager 318 on Device A 310 may communicate with record manager 312 to access records 315. Likewise on Device B 320, synchronization manager 328 may communicate with record manager 322 to access records 325. Comparisons of information contained in records 315, 325 of each device is performed in order to identify record data 336. One or both devices may generate and send record data 336 to the other device for purpose of updating records kept on that other device. Thus, for example, the record data 336 may be in the form of information to update a set of records on one computing device based on changes to its corresponding record set on the other computing device. Alternatively or additionally, the record data 336 may carry data for generating corresponding records on one computing device based on new records created on the other computing device. Different synchronization rules may be followed by the synchronization managers 318, 328 in synchronizing records 315, 325. For example, the rules may specify that synchronization means the set of records on one of the devices completely overrides the set of records on the other computing device. Alternatively, the rules may specify that set of records on each device are reconciled, compared and edited based on modifications to the corresponding record on the other computing device. After a synchronization event, the records on each computing device have correspondence, in that each record may modify, overwrite, or be overwritten by a designated other record on the other computing device.

In a given time frame (such as when the user is traveling or mobile), Device A 310 may be preferred by the user and operated by the user to view, edit and create records 315. A situation may arise where the user's preference is to have the capabilities 321 of Device B 320 in order to perform a task. In one embodiment, the user effectuates the switchover by activating Device B 320 and enabling Device B to communicate with Device A 310 over channel 305 while Device A is already in an active state. In one embodiment, these conditions (or sequence of events) are identified as a switchover event 323 by Device A 310 and/or Device B 320. In response to detecting the switchover event, one or both devices cause information 332 about the state of use of one or more records on Device A 310 to carried over to Device B 320. The information 332 may be carried over automatically, or at least with minimal user-intervention, in response to the switchover event being detected.

The detection of the switchover event 323 and the implementation of the switchover may be implemented by the switchover managers 316, 326 of the respective data sharing modules 319, 321. The switchover manager 316,326 of each device performs the functions for enabling a user to switch computing devices. In one implementation, the occurrence of the switchover event 323 may be detected by the switchover manager 326 on the Device B 320 (the receiving device), which then sends a notification 313 of the switchover to the switchover manager 316 of the Device A 310 (or the initial device). As the initial device, the switchover manager 316 of the Device A 310 may perform operations corresponding to identifying a state of use of that first computing device, including the state of use of one or more of the records 315 that are active, open, recently used, stored, or of interest through some other designation. In one implementation, the switchover manager 316 may determine the information about the records in use form the user-interface 317 of the application 309. For example, information displayed on the screen of Device A 310 by the user-interface 317 may identify a record in use. In response to detecting the switchover event notification 313, the switchover manager 316 identifies, for example, anyone or more of the following: an account in use, a directory or folder view, and or one or more open or selected records. The state information 332 is sent from the switchover manager 316 of the Device A 310 to the switch over manager 326 of the Device B 320. The switchover manager 326 of the Device B 320 handles the state information 332 by implementing a corresponding state on the second computing device 320 that is at least partially reflective of the state on the first computing device 310. In one implementation, the switchover manager 326 may communicate with the user-interface 327 to implement the state. The user-interface 327 in turn, may communicate with the record manager 322 to cause the corresponding records to be accessed and placed in a state of use.

According to one or more embodiments, the state implemented by the second switchover manager 326 may correspond to anyone or more of the following (as determined by the state on the first computing device): implementation of an account in use on the first computing device, implementation of a folder or directory view present at the time of switchover on the first computing device, and opening or selecting records that are opened or selected on the first computing device 310.

In an example provided by FIG. 3, a record R1 303 is assumed to be in an open state on Device A 310. The Device B 320 may detect the switchover event 323, and send the notification 313 to Device A 310. In response, Device A sends state information 332 that specifies the record R1 303 (because it is open), and indicates that the record R1 is in an open state. If the record R1 303 was modified on Device A 310, the state information 332 may exclude information about the modification, or information about the modification may be ignored by Device B 320. Rather, the information 332 may be used simply to identify a corresponding record R2 333, and to provide that record in an open state on Device B 320. Thus, one embodiment provides that modifications made to record R1 303 on Device A 310 need not be carried over to its corresponding record R2 333 on Device B 320. However, other implementations may provide that Device A identifies some or all of the modification to record 303 in the state information 332.

An embodiment provides that Device A 310 and Device B 320 are maintained in a synchronized state for effecting switchovers between the devices. One or more background processes may be performed using synchronization managers 318, 328 to cause records 315 and 325 to be synchronized. These processes may be performed periodically and/or in response to events. In one embodiment, a synchronization process is performed each time a switchover event is detected. When a new record is created on one device, the synchronization processes between the two devices causes a corresponding record to be generated on the other device. In the case where the user generates a new record on Device A 310 and then switches over, the switchover may be combined with a synchronization event. The result is that a corresponding record is generated on Device B 320, and the information 332 about the record is then used to provide that record in a particular state of use. Stated otherwise, information 332 may carry data to generate a new record as well as to indicate the record should be in a particular state. Thus, for example, when a user generates a reply message to an existing message on Device A 310 and then initiates a switchover, a corresponding reply message may be generated on Device B 320, and this message may be provided in an open or draft state.

After the switchover, the user may perform various tasks and operations on the record for which state of use information 332 was exchanged. As a result, the record may be modified and saved on the Device B 320. In a subsequent synchronization process, an update about that record may be communicated to Device A 310. As an alternative, the user may perform a switchover from Device B 320 to Device A 310. In this alternative, the state of use information 332 may include record modifications.

Wireless Handheld Implementation

Embodiments of the invention may be implemented in the context of linked computing devices that are shared by a common user. One specific context is the case of a person who carries a smart phone and a laptop or personal digital assistant. In such a scenario, the user may be motivated to combine the functionality and capabilities of the two computing devices, but only on a need-to basis. For example, the user may rely on smart phone for its mobility, but in instances such as when the user needs to enter text, view a large-screen, or take advantage of superior speakers, the user's preference may be to switch computing devices. The person may be able to establish a communication link between the two computing devices using for example, Bluetooth, WIFI, or cables. In the case of local wireless links such as Bluetooth or WIFI, the user may be able to establish a wireless communication channel between his two computing devices automatically, and perhaps continuously when the devices are powered on.

Figure 4:
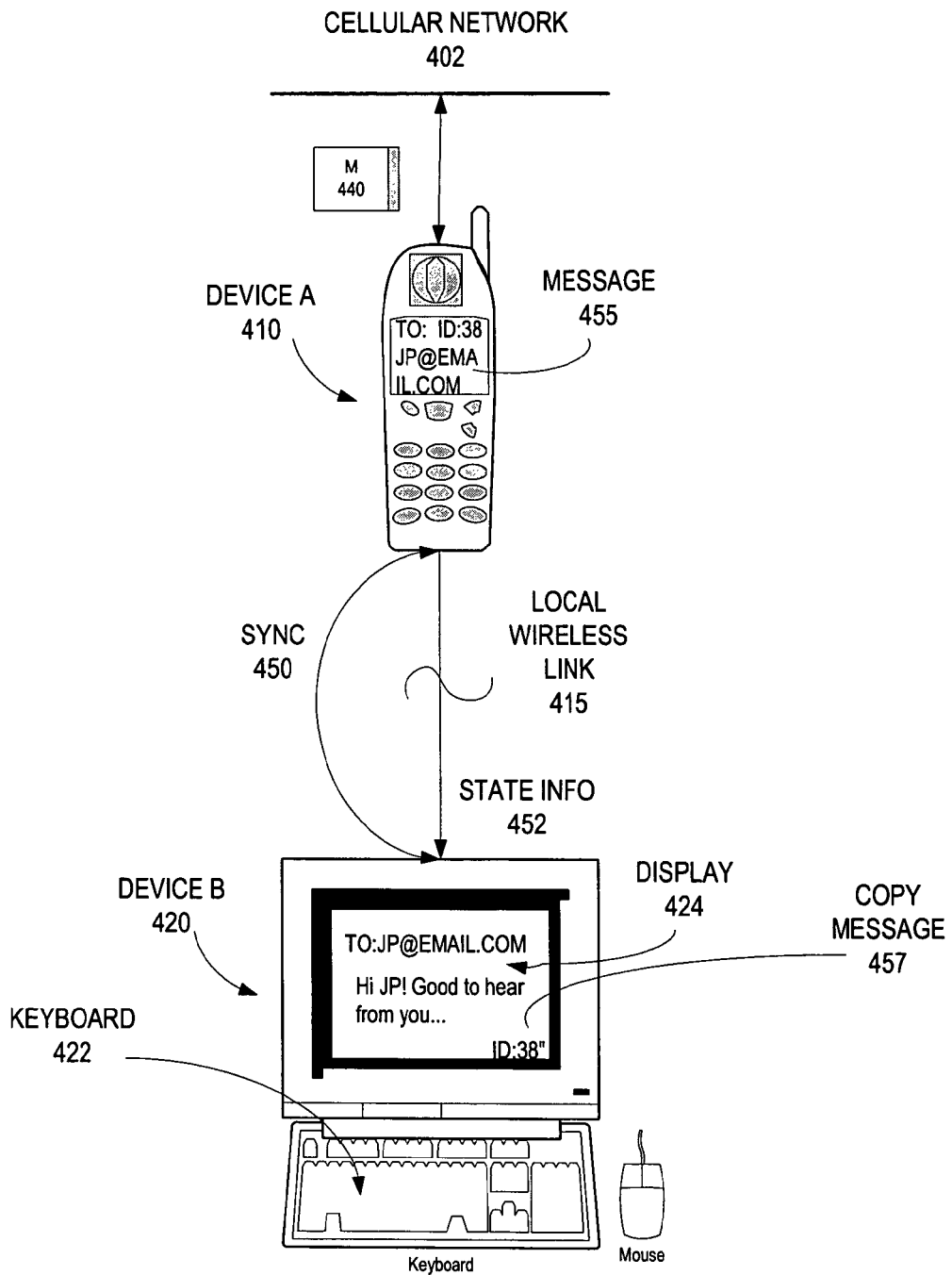
FIG. 4 illustrates a system for sharing state information and resources amongst two or more portable computers having different functionality or capabilities, under an embodiment of the invention.

FIG. 4 illustrates a system for sharing state information and resources amongst two or more portable computers having different functionality or capabilities, under an embodiment of the invention. In an implementation shown, a handheld computer 410 is paired with a portable specialized device 420 having a form factor similar to a small laptop computer. The handheld computer 410 may correspond to a smart phone, or phone/PDA combination. Examples of such computing devices include the HANDSPRING TREO 650, manufactured by PALMONE INC. The handheld computer 410 may include cellular voice and data communication capabilities, using cellular systems such as Code Division Multiple Access (CDMA) or Time Division Multiple Access (TDMA). The handheld computer 410 may also include personal information management (PIM) software, such as electronic calendars, phone/address books, memos, ink notes, and voice memos. Additionally, handheld computer 410 may provide wireless messaging functionality using a wireless email application (e.g. VERSAMAIL) that transmits and receives data using the device's cellular capabilities. The handheld computer 410 may include an operating system (e.g. PALM OS) that enables instant-on functionality, and one button access to launch applications and/or view records from specific applications. The handheld computer 410 may be designed to minimize size to promote its use as a cellular phone. But to enable its use as a computing device that can be used to transmit messages and enter data for records, the handheld computer 410 may include an integrated mini-keyboard 412 suited for "thumb-typing". A display 414 may also be provided on the handheld computer.

The specialized device 420 may be configured with capabilities and characteristics that facilitate users in mobile settings. Examples of such capabilities and characteristics include: (i) the ability of the computing device to turn instantly-on, with no boot-up time, (ii) a light operating system, and (iii) one button access to various applications, functions, and records, including PIM applications. One difference between specialized device 420 and handheld device 410 is size. Specialized device 420 may be sized to accommodate a ten-finger QWERTY keyboard 422 and a corresponding larger display 424. Another difference between specialized device 420 and handheld device 410 may be that the specialized device has more available processing, memory resources, and/or software functionality.

In one embodiment, handheld device 410 and specialized device 420 are each configured to be compatible and assigned (or otherwise paired to) another. As such, each of the two devices may include local wireless communication capabilities, such as provided by Bluetooth or WIFI. As paired devices, each device is configured to seek its local wireless communication capabilities to seek the other device out and to establish a communication link 415. Furthermore, each device may act as an extension of the other device. Accordingly, each device may be configured in a manner described with FIG. 3, so that the devices use the communication link 415 to synchronize and process other communications with one another. As instant-on devices, the handheld device 410 and specialized device 420 may each have the capability to be inactive, but at the same time carry out communication exchanges, including synchronization processes with one another, across the communication link 415.

In addition to being paired, various other types of functionality and programming may be provided for each of the computing devices. One example of such additional functionality is the inclusion of digital camera features for capturing, managing and messaging images. Another example of additional functionality includes music file storage, management and playback, through MP3 players and other similar programs.

To further the use of the two computing devices as paired devices, one or both devices may be configured to facilitate users in switching from handheld device 410 to specialized device 420. FIG. 4 illustrates an embodiment to facilitate the user in switching devices in the context of messaging. The handheld computer 410 may be configured to receive messages wirelessly over cellular network 402. The specialized device 420 may be previously assigned to the handheld device 410 to enable the user to programmatically carry over the state of the messaging application and/or messaging records when desiring to switch from the handheld device 410 to the specialized device 420. The motivation for the user to make the switch may be that the user prefers the larger display 424 or keyboard 422 of the specialized device 420, to that the user prefers some other capability that is provided with the specialized device but not the handheld device 410 (e.g. better speakers or microphone, more resources to render streaming or media files, pointer/mouse functionality).

In an embodiment shown by FIG. 4, communications exchanged across the communication link 415 include data and information for performing synchronization processes 450. The synchronization processes 450 may be performed periodically and/or in response to certain events, such as user-direction or at each establishment of communication link 415. When communication link 415 is established, the synchronization processes 450 may be performed as background operations. Thus, the two devices may not necessarily need to be active in order for the synchronization processes 450 to be performed. The synchronization processes 450 may be used to create correspondence between files and records of various data types, including for example, PIM records, documents, images, and music files.

In an example provided by FIG. 4, handheld device 410 receives messages 440 over cellular network 402. The messages 440 may be for multiple user-accounts. For example, the user may use handheld device 410 to retrieve messages delivered to more than one email address. The handheld device 410 may mange incoming messages using one or more folders (e.g. inbox). These folders may include folders created by a user to organize messages. The handheld device 410 may also transmit outgoing messages, and handheld device 410 may maintain a copy of outgoing messages in another folder (e.g. Sent Items). Additionally, the handheld device 410 may be used to compose messages. Newly composed but uncompleted messages may be maintained in a separate folder (e.g. Draft). In the context of messaging, synchronization processes 450 cause the two computing devices to have, at least immediately after when a synchronization process is performed, an equivalent or identical set of messages. For example, received messages on the handheld device 410 ma have text-based copies on the specialized device 420. Attachments of certain file types may be copied as part of corresponding messages on the other computing device as well. Individual messages in the set of each device are compared against, generated from, or used to generate, a message on the other computing device. In this way, a set of messages on handheld device 410 has correspondence to a set of messages on specialized device 420.

In addition to messages, the use of folders on one device may be replicated on the other device as a result of a synchronization process 450. For example, a user may create a folder to maintain files or records on one device. The synchronization process 450 may cause a corresponding folder (having the same name) to be created on the other device, having corresponding file items copied from the synchronization process.

In addition to performing synchronization processes 450, embodiments of the invention provide that the user can cause the occurrence of a switchover event. The switchover event may be detected by one or more both computing devices. In one implementation, the switchover event causes the transfer of state information 452 that facilitates the user in transitioning from using the handheld device 410 to using the specialized device 420. The state information 452 transferred corresponds to information about the state of use of the handheld device 410. For existing messages and records, an embodiment provides that the state information 452 include one or more of the following: (i) identification of a user account of the handheld device, a service account accessed by the handheld device, or a messaging account from which messages are retrieved and/or transmitted; (ii) identification of folders in an open state, or otherwise in a used state (e.g. selected or highlighted); (iii) identification of messages (or other records and documents) that are in the open and/or selected state; and (iv) information about attachments, including whether the attachment of an open or selected message is in an open state.

In the example provided by FIG. 4, a message 455 ("ID: 38") is in an open state on the handheld device 410. The corresponding message 457 ("ID:380") on specialized device 420 is also opened as a result of the state information 452 that is communicated between the devices in response to a switchover event. The synchronization processes 450 and the state information 452 combine to enable the specialized device 420 to mirror the state of the handheld device 410.

The manner messages and records that are newly received, created and/or modified are handled in response to a switchover is a matter of design choice. In one embodiment, the switchover event triggers the computing devices to perform a synchronization process. Upon the occurrence of the switchover event, newly received messages on the handheld device 410 may be copied for a corresponding message on the specialized device 420 as a result of the synchronization process being performed. The state information 452 may then identify the state of the newly received message on the handheld device 410.

In one embodiment, newly composed messages on the handheld device 410 are ignored by state information 452. The synchronization process 450 mayor may not create a copy of such newly composed message. As one alternative to ignoring a newly composed message, state information 452 may include identification of saved composed messages (e.g. items in draft folders) that are in use or selected for use on the handheld device 410. As another alternative to ignoring newly composed messages, for the case where the user composes a new message, provides body and/or address information for the message, and switches over to the specialized device 420 without closing that message or saving it, the state information 452 and/or the synchronization processes 450 may carry information for creating (i) a copy of the message, including the body or the header, or (ii) a copy of the message with just the header.

In an embodiment, if at the time of the switchover, an existing record is open and modified after it was most recently opened, the modifications made to the record after it was open may not be identified or part of state information 452. Thus, entry of a word or sentence into an open record does not, after the occurrence of a switchover, cause that word or sentence to be generated on the corresponding message on the specialized device 420. As mentioned above, this constraint is a matter of design choice. Thus, an alternative embodiment may provide that the state information 452 carries over identification of the open record and information about changes or additions made to that record.

Open messages on the specialized device 420 may form the basis of new messages composed on that device. For example, a user may open message 455 on handheld device 410 and then initiate a switchover. The specialized device 420 may have a copy or corresponding message, generated from a past or concurrently performed synchronization process 450. When the switchover is detected, state information 452 may be received and processed by the specialized device 450, to cause copy 457 to be provided in an open state on specialized device 450. If the message 455 had an attachment open, message 457 would also have the attachment open as a result of the state information 452. If applicable, the state information 452 may identify and use the account and/or folder (e.g. inbox of a work email) of the message 455 as it is maintained on the specialized device 450.

Switch Over Event

Figure 5:
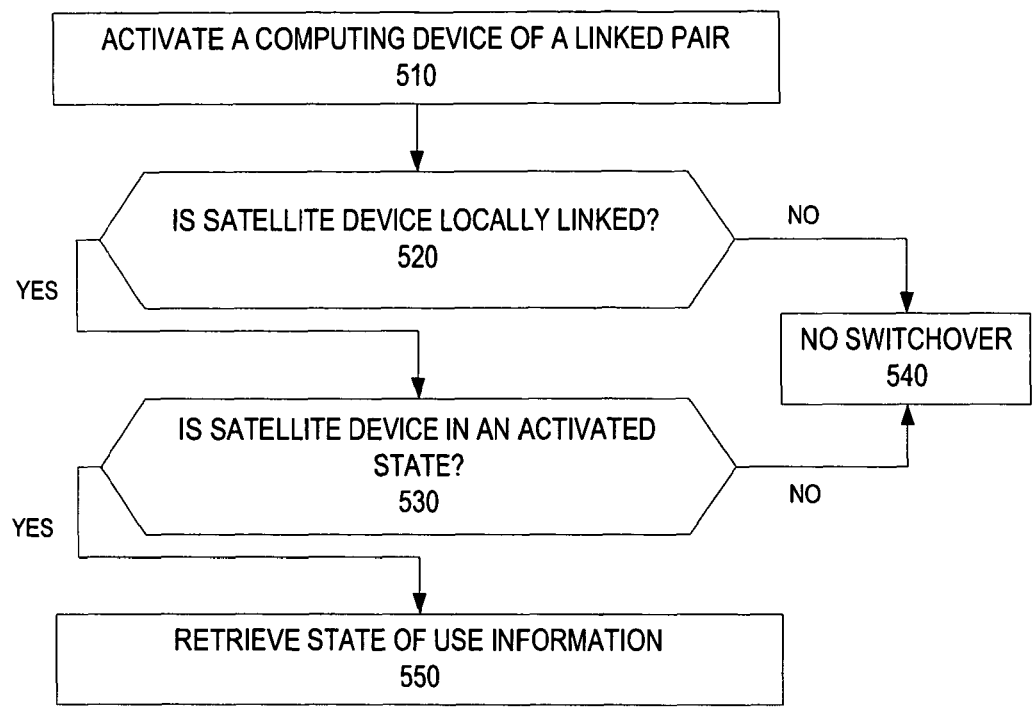
FIG. 5 illustrates a method for detecting the occurrence of a sequence of events or conditions that correspond to a switchover event, under an embodiment of the invention.

FIG. 5 illustrates a method for detecting the occurrence of a sequence of events or conditions that correspond to a switchover event, under an embodiment of the invention. An embodiment such as described by FIG. 5 may be implemented on one of two computing devices that are linked or are otherwise configured to function as associates of one another. In describing an embodiment of FIG. 5, reference may be made to elements of FIG. 4 for purpose of describing suitable elements for performing a step of the method.

Step 510 provides that one computing device of a linked pair is activated. For example, specialized device 420 may be switched on and enabled to receive local wireless communications (such as through Bluetooth). Additionally, an activated device is prepared to receive input and provide output, such as through a display. When activated, specialized device 420 may have its display powered, and key entries made by the user may be received as input that is reflected on the display.

In step 520, the activated device uses its local wireless radio to identify whether the associated or paired device (e.g. the handheld device 520) is linked through the local wireless medium (e.g. Bluetooth).

In step 530, a determination is made as to whether the associate device is active, or if its wireless radio is on but the device is in an inactive or sleep mode. If the device is in the active state, the significance is that the user was probably just using it. Thus, the likelihood increases that the activation of the device corresponds to the user wishing to switch computing devices.

If the determination in either step 520 or 530 is negative, step 540 provides that the computing device operates as if no switchover takes place. In this result, activation of the computing device is becomes an isolated event. For example, activation of specialized device 420 without the radio of handheld device 410 being powered would result in no state information 452 being provided to the specialized device 420.

If the determination in both step 520 and 530 is affirmative, step 550 provides that a determination is made that a switchover event has occurred, and state information is transferred from the associate device to the newly activated device. The determination that the switchover event may be made by the newly activated device, although it can be made by either device depending on the implementation. For example, when specialized device 420 is activated, it may seek out the handheld device 410 on the local wireless link. If the specialized device 420 locates the handheld device 410 on the wireless link in an active state (with its radio on), it may signal the handheld device 410 to transmit state information 452.

FIG. 5 illustrates that an embodiment in which the switchover event corresponds to the occurrence of a specific condition or action, or sequence of conditions/actions. If the designated sequence is not present, no programmatic switchover may occur, absent manual intervention. Thus, for example, with reference to FIG. 4, if the specialized device 420 is activated first, then the handheld device 410, no switchover is detected and state information is not exchanged between the two computing devices.

An embodiment provides that the user can override or reconfigure what is recognized as a switchover event. For example, the user may initiate a switchover using a button or other manual command, thereby causing the programmatic transfer of state information, as well as the implementation of a state on a new computing device based on that information. Alternatively, the user may reprogram one or both computing devices in what conditions or events signify the switchover event. For example, a user's preference may be to have state information transferred from handheld device 410 to the specialized device 420 each and every time both computing devices are active, regardless of which device was activated first.

Numerous other variations, conditions and events may be used to signify the occurrence of the switchover event. In one embodiment, the switchover event is manually triggered by a command (e.g. the pressing of a button or sequence of buttons on the specialized device 420) from the user, in which the state of the device in use is programmatically configured to mirror or correspond to the other device in the pair. As another alternative, in addition to activating the device in use as a first step, the user may need to launch an application for which records or other resources have correspondence to records/resources of the associate device. For example, the user may launch an email application that manages messages, including a set of messages that have correspondence to messages on the associate device.

EXAMPLES

FIGS. 6A-6F illustrate different use examples of how state information may be used to ready different application resources for use in response to detecting a user's intent to switch computing devices, according to one or more embodiments of the invention. In the context of a linked pair of devices FIGS. 6A-6F are simplified illustrating of screen shots of an initial device just before a switchover, and a receiving device just after the switchover event. For purpose of illustration, the initial device is a handheld device 610, and the receiving device is a larger portable computer 620 (such as illustrated with specialized device 420). Any reference made to elements described with FIG. 4 is made for illustrative purposes.

Figure 6A:
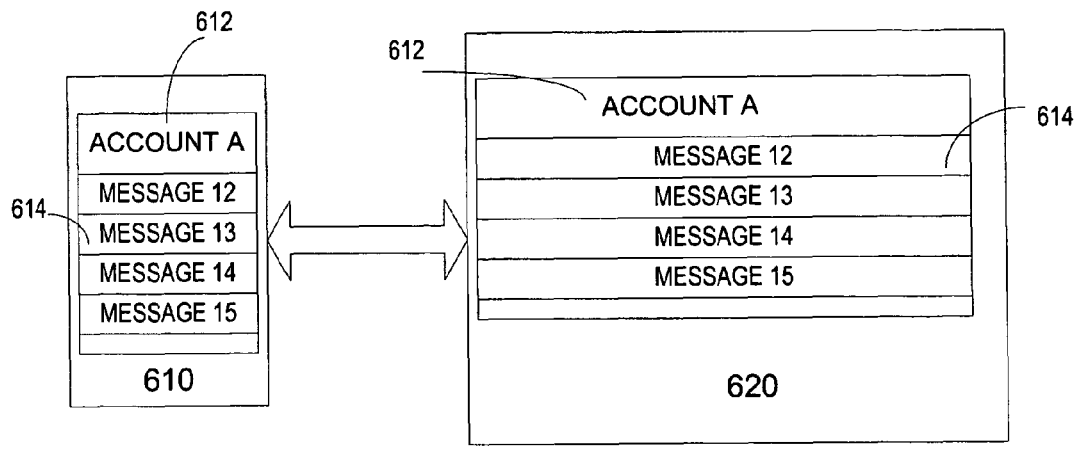
FIGS. 6A-6F illustrate different use examples of how state information may be used to ready different application resources for use in response to detecting a user's intent to switch computing devices, according to one or more embodiments of the invention.

In FIG. 6A, at the time a switchover occurs, a state of handheld device 610 is account specific. Information about this state is carried over to the larger device 620, which then configures itself to provide the same account. For messaging applications, account information specifies the email account in use. Each email account may include its own email address and collection of stored or managed emails. For example, a user may have a personal email account, or a work/corporate email account that he uses and manages on both handheld device 610 and portable computer 620. In the example provided by FIG. 6A, the user may open the messaging application on the handheld device 610 and have his corporate account active. Once the switchover event is detected, the state information is carried over from the handheld computer to the portable computer 620. Subsequently, the email application is launched (if not already running) on the portable computer with the corporate account in the state of use. Thus, the state information sent by the handheld device 610 causes the portable computer 620 to run the email application with the same account 612 in the state of use. Thus, as described in the example of FIG. 6A, the switchover event causes the portable computer 620 to automatically run the email program with the email account that was in use on the handheld device 610 in an open and ready state. This would mean, for example, that any messages 614 composed on the mobile computing device 620 would be from the email address of the corporate account, or that the inbox displayed is of the corporate account.

Figure 6B:
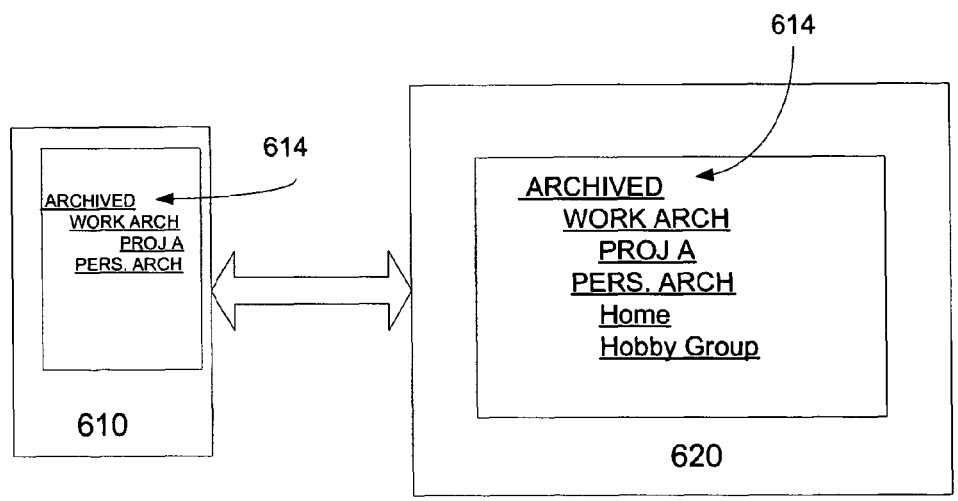

FIG. 6B illustrates the inclusion of system data as part of what is carried in the state information. In one embodiment, the system data represents a list of active or presented folders 624 on the handheld device 610 at the time the switchover is detected. These folders 624 may form part of directory structure and/or be present in a window that is open on the handheld device 610 just prior to the switchover. In response to detecting the switchover event, the larger device 620 may receive the system data as part of the state information, and as a result, present the same directory or window view for the use in response to detecting the switchover event. Since the display size of the larger device 620 is assumed to be larger, more of the directory/window view may be shown on the portable device.

Figure 6C:
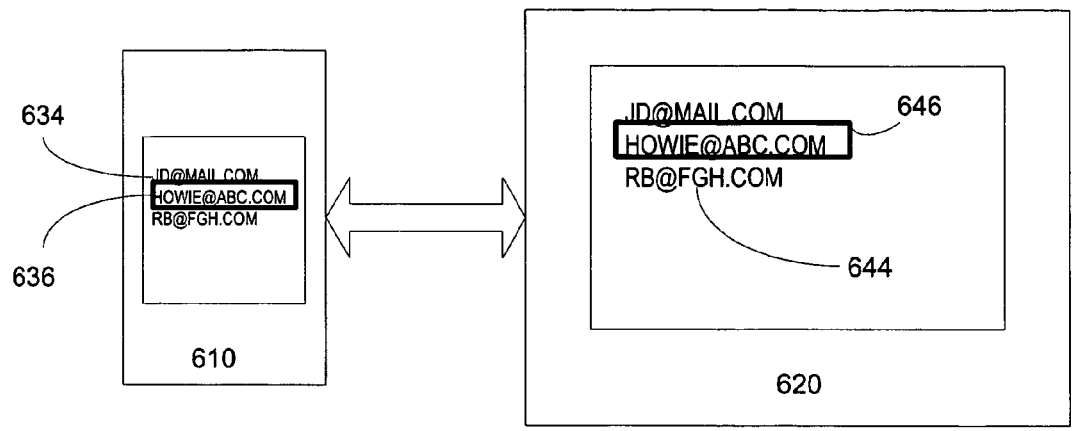

FIG. 6C illustrates the use of state information to carry over onto the receiving device 604 information about what records (or other items) on the initial computing device are in a selected state. At the time of the switchover event, handheld device 610 may have a record 634 in a selected state 636. The selected state 636 may correspond to the user highlighting or using user-interface features on the handheld device 610 to indicate a desire to select that record. A subsequent selection of a record in a selected state may cause that item to be opened or executed. After the switchover event, the state information transfers information that identifies the record 634, as well as the selected state 636 of that record. On the receiving device, a corresponding record 642 is provided in a corresponding selected state 644, so that selection of the corresponding record 642 would cause that record to be opened. The record 642 may be, for example, a copy of the message 634, as determined in a previous synchronization process.

Figure 6D:
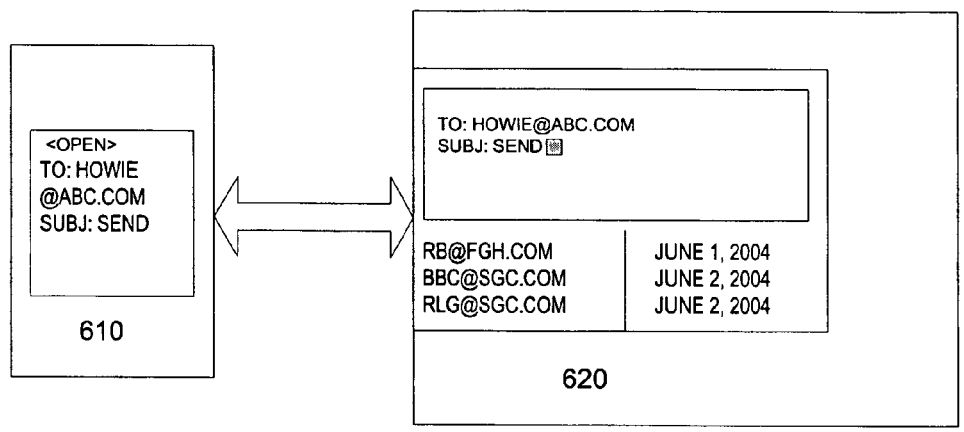

FIG. 6D illustrates the use of state information to carry over onto the handheld device 610 information about open records. In the example provided, a list of email messages are records on the handheld device 610 that have correspondence to a list of email messages on the larger device 620. On the handheld device 610, the list may be hidden, due to the small screen size. Only an opened message 654 is displayed. At the time of the switchover, the opened message 654 is identified. The state information transmitted to the larger device 620 identifies the opened message 654. A corresponding message 664 is identified and opened on the larger device 620. On the larger device 620, there is sufficient display area to show the opened message 664 with a listing of other messages (shown in a closed state).

Alternate Implementations

Figure 6E:
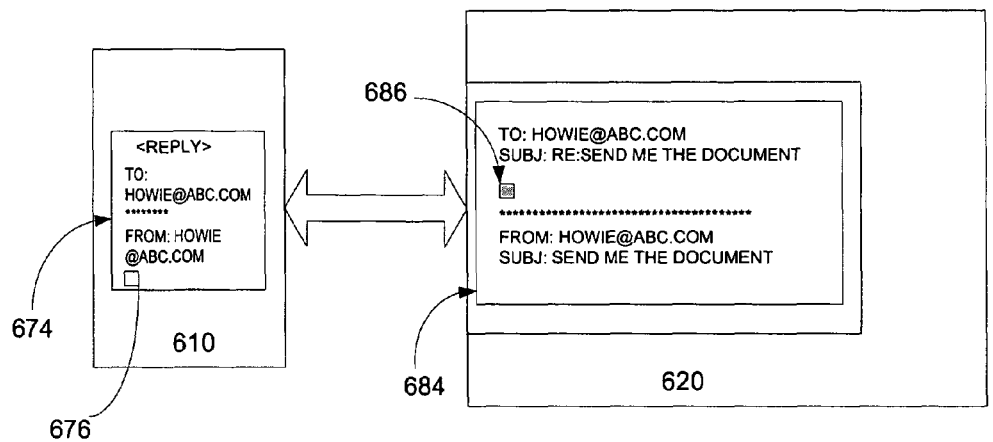
Figure 6F:
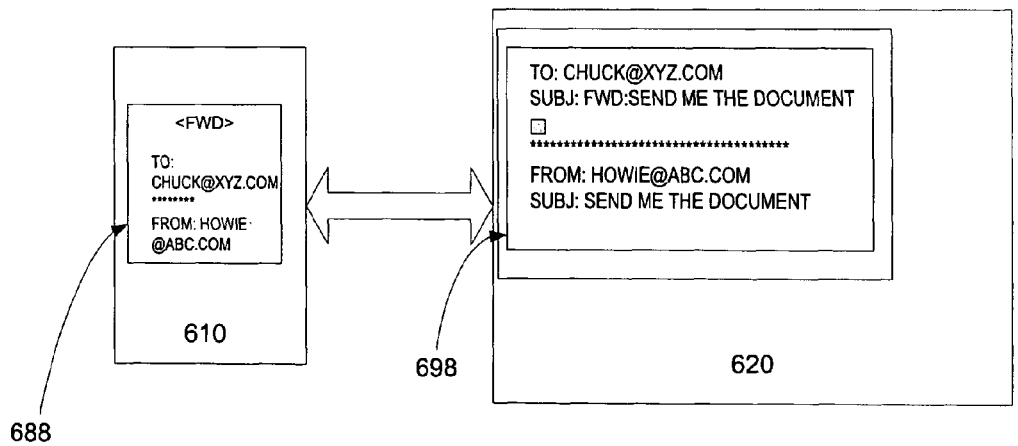

FIGS. 6E and 6F illustrate alternative implementations in which state information corresponds to new records, modifications or data entry made on the handheld device 610 and carried over onto the larger device 620.

FIG. 6E illustrates the scenario in which a reply message 674 is created on the handheld device 610. The reply message 674 may be created off an existing message in, for example, an inbox folder. For example, the user may select a reply action when viewing a message on the handheld device 610. The reply message 674 is one that automatically generates a destination address based on the sender of the existing message. The reply message 674 may automatically carry over data or content from the original message. When the switchover event is detected, data from the reply message 674, including its contents at the time of the switchover, are included in the state information. Alternatively, the creation of a new message may invoke a synchronization process that causes contents of the reply message 674 to be copied over onto the larger device 620. In either case, a corresponding reply message 684, such as in the form of a copy, may be generated on the larger device 620. This allows the user to initiate a reply on, for example, the handheld device 610, but as a matter of preference, switch over to the larger device 620 for access to a full-size keyboard or other functionality. At the time of transfer, the newly generated reply messages 674, 684 may be so similarly provided that a cursor's 676 position within the message 674 is replicated with cursor 686 on the corresponding reply message 684.

FIG. 6F illustrates the scenario in which a forward message 688 is created on the initial handheld device 610. The forward message 688 may be handled similarly to the reply message 674, except that the user may have to select the destination address for the forward message. The destination address may be provided on either the handheld device 610, or on the larger device 620. When provided on the handheld device 610, the address may be carried onto the handheld device 620 in response to detection of the switching event, along with other content contained in the draft message. Prior to the switchover event, the forward message 688 in progress may be partially or completely replicated with a corresponding forward message 698 on the larger device 620. The degree to which the corresponding forward message 698 replicates forward message 688 of the handheld device 610 is a matter of design. For example, the address, the address body, and/or an attachment may be identified and replicated in response to the switchover event. To further the example, the degree of replication may carry to placement of the cursor.

Hardware Diagram

Figure 7:
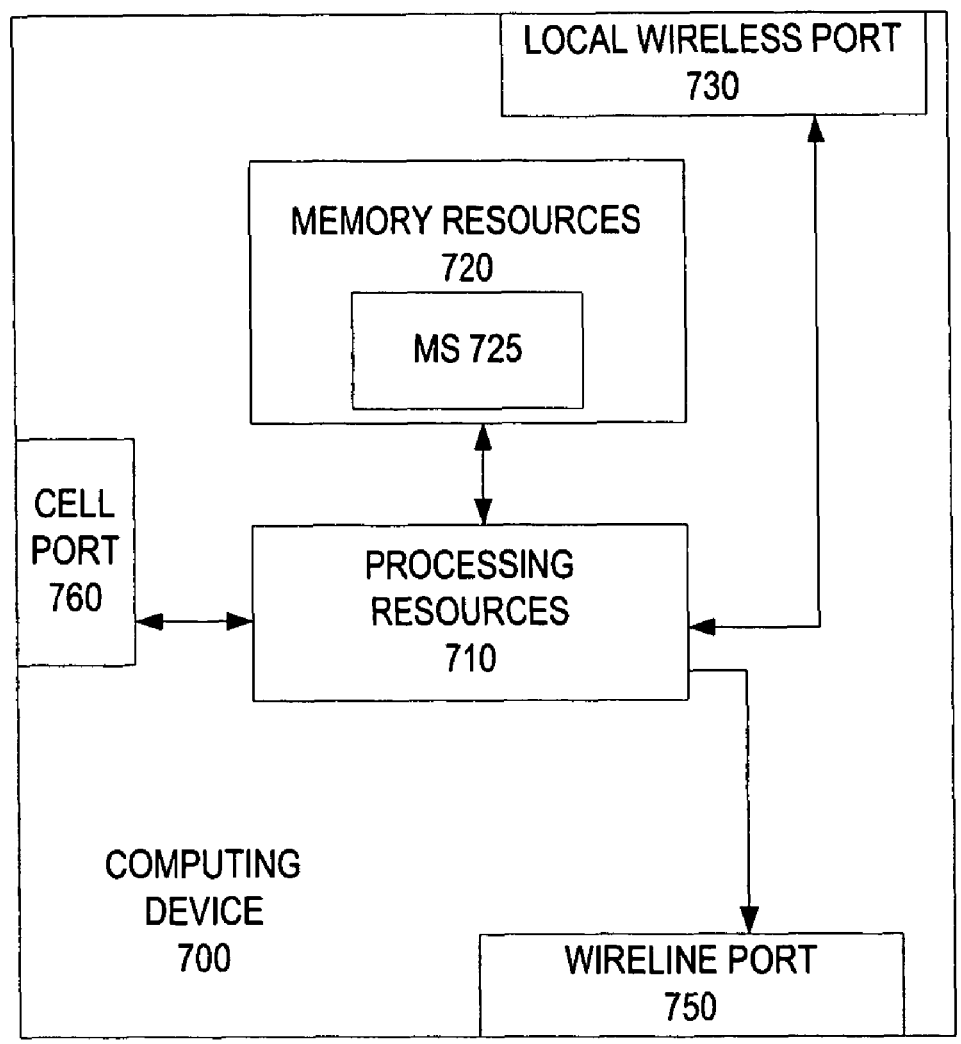
FIG. 7 illustrates a simplified hardware diagram of a computing device, under an embodiment of the invention.

FIG. 7 illustrates a simplified hardware diagram of a computing device, under an embodiment of the invention. Basic elements of the computing device 700 include processing resources 710 (e.g. one or more processors), memory 720 (volatile and/or non-volatile), a local wireless port 730, display 740, and wireline port 750. In the case where the computing device 700 corresponds to a cellular device, a cellular port 760 may also be included. The memory 720 may carry a mirroring state program 725 to enable the computing device 700 to generate or implement a mirror state. The mirror state is any state of use that is based on the present state of use of another computing device. The mirroring state program 725 may be used to create a mirror state on the handheld device based on information from another device, or to create a mirror state on another computer based on information provided from that handheld device.

In the case where the computing device 700 is an initial device in the switchover, the mirror state program may generate state information in response to the occurrence of a switchover event. The state information may provide information about records, documents, data objects and other application resources in use on the device just prior to (or about the same time as) the occurrence of the switchover event.

In the case where the computing device 700 is a receiving device of the switchover event, the mirror state program 725 may use state information received from another computing device in response to the switching device. Implementation of the state information may mean that the computing device presents system data (account or directory view), displays or opens records, or performs other functions such as execute programs.

Other Alternate Embodiments

While embodiments such as described with FIG. 4 recite a combination of a handheld device and a specialized device 420, other embodiments may utilize virtually any kind of computing and/or accessory device. For example, an embodiment of the invention may be implemented using any two devices having capabilities and/or primary functions selected from a group consisting of: PDA; cellular phone; portable media player; voice recorder; GPS device; laptop computer; desktop computer; and Internet appliance.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for switching use between a first computing device and a second computing device, the method being performed by one or more processors of the first computing device and comprising:
    detecting an event while a first application is operated on the first computing device; and
    in response to detecting an event, (i) automatically transmitting data for the first application to the second computing device, and (ii) automatically initiating a second application on the second computing device, the second application having a functionality that is equivalent to a functionality of the first application and that utilizes the data transmitted from the first device in performing one or more operations.

2. The method of claim 1, wherein the data for the first application includes state information relating to a state of the first application at the time the event is detected.

3. The method of claim 2, wherein the second application on the second computing device is automatically initiated in a state corresponding to the state of the first application based on the state information.

4. The method of claim 1, wherein the event corresponds to one or more user actions that signal a user's intent to switch use of the first computing device to the second computing device.

5. The method of claim 1, wherein the first computing device and the second computing device have at least one different set of capabilities.

6. The method of claim 1, wherein the data of at least a first type includes account information of a user.

7. The method of claim 1, wherein the first application is one of a messaging application, a word processing application, a contacts application or a calendar application.

8. The method of claim 1, further comprising in response to detecting the event, disabling the first computing device.

9. A computing device comprising:
    a communication port;
    one or more processors coupled to the communication port; and
    a memory resource coupled to the one or more processors, the memory resource storing instructions that, when executed by the one or more processors, cause the one or more processors to:

detect an event while a first application is operated on the first computing device; and in response to detecting an event, (i) automatically transmit data for the first application to the second computing device, and (ii) automatically initiate a second application on the second computing device, the second application having a functionality that is equivalent to a functionality of the first application and that utilizes the data transmitted from the first device in performing one or more operations.

10. The computing device of claim 9, wherein the data for the first application includes state information relating to a state of the first application at the time the event is detected.

11. The computing device of claim 10, wherein the second application on the second computing device is automatically initiated in a state corresponding to the state of the first application based on the state information.

12. The computing device of claim 9, wherein the event corresponds to one or more user actions that signal a user's intent to switch use of the first computing device to the second computing device.

13. The computing device of claim 9, wherein the first computing device and the second computing device have at least one different set of capabilities.

14. The computing device of claim 9, wherein the data of at least a first type includes account information of a user.

15. The computing device of claim 9, wherein the first application is one of a messaging application, a word processing application, a contacts application or a calendar application.

16. The computing device of claim 9, wherein the memory resource stores instructions that, when executed by the one or more processors, cause the one or more processors to, in response to detecting the event, disable the first computing device.

17. A system for switching use between a first computing device and a second computing device, the system comprising:

a first computing device comprising:
   a communication port;
   one or more processors coupled to the communication port; and
   a memory resource coupled to the one or more processors, the memory resource storing instructions that, when executed by the one or more processors, cause the one or more processors to:
      detect an event while a first application is operated on the first computing device; and
      in response to detecting an event, (i) automatically transmit data for the first application to the second computing device, and (ii) automatically initiate a second application on the second computing device, the second application having a functionality that is equivalent to a functionality of the first application and that utilizes the data transmitted from the first device in performing one or more operations.

18. The system of claim 17, wherein the data for the first application includes state information relating to a state of the first application at the time the event is detected.

19. The system of claim 18, wherein the second application on the second computing device is automatically initiated in a state corresponding to the state of the first application based on the state information.

20. The system of claim 17, wherein the first application is one of a messaging application, a word processing application, a contacts application or a calendar application.

* * * * *

UNITED STATES PATENT AND TRADEMARK OFFICE
CERTIFICATE OF CORRECTION

PATENT NO.        : 8,175,643 B1
APPLICATION NO.   : 13/298073
DATED             : May 8, 2012
INVENTOR(S)       : Jeffrey Hawkins Page 1 of 1

It is certified that error appears in the above-identified patent and that said Letters Patent is hereby corrected as shown below:

In the Claims:

Column 20, line 31 (Claim 1, line 7), replace "an event" with --the event--.

Column 20, line 37 (Claim 1, line 13), replace "first device"
    with --first computing device--.

Column 20, line 53 (Claim 6, line 1), delete "of at least a first type".

Column 21, line 2 (Claim 9, line 10), delete "first".

Column 21, line 3 (Claim 9, line 11), replace "an event" with --the event--.

Column 21, line 4 (Claim 9, line 12), replace "the second" with --a second--.

Column 21, line 9 (Claim 9, line 17), replace "the first device"
    with --the computing device--.

Column 21, line 21 (Claim 13, line 1), replace "the first computing device"
    with --the computing device--.

Column 21, line 24 (Claim 14, line 1), delete "of at least a first type".

Column 22, line 14 (Claim 17, line 14), replace "an event"
    with --the event--.

Column 22, line 21 (Claim 17, line 21), replace "the first device"
    with --the first computing device--.

Signed and Sealed this
Nineteenth Day of March, 2013

Teresa Stanek Rea
*Acting Director of the United States Patent and Trademark Office*